United States Patent [19]

Wang et al.

[11] Patent Number: 5,305,381
[45] Date of Patent: Apr. 19, 1994

[54] CRADLE FOR TELEPHONE

[76] Inventors: Chin Y. Wang, #167 Lane 131 Sec 2 True Hsing Rd., Pan Chiao Taipei Hsien, Taiwan; Timothy Sheahan, 3089½ Ewing Ave., Altadena, Calif. 91001

[21] Appl. No.: 973,031
[22] Filed: Nov. 9, 1992
[51] Int. Cl.⁵ .............................................. H04M 1/00
[52] U.S. Cl. .................................... 379/455; 379/454; 379/426
[58] Field of Search .............. 379/426, 428, 446, 454, 379/455, 449; 455/89, 90; 248/316.4, 231.4; 24/524, 523, 527

[56] References Cited

U.S. PATENT DOCUMENTS

| | | | |
|---|---|---|---|
| D. 301,473 | 8/1986 | Rojc | D14/137 |
| 4,355,212 | 10/1982 | Kosten | 379/433 |
| 4,406,928 | 9/1983 | MacKenzie | 379/446 |
| 4,723,281 | 2/1988 | Peiker et al. | 379/445 |
| 5,121,863 | 6/1992 | Kotitalo et al. | 379/446 |
| 5,187,744 | 2/1993 | Richter | 379/449 |

Primary Examiner—James L. Dwyer
Assistant Examiner—Jack Chiang
Attorney, Agent, or Firm—L. Lee Humphries

[57] ABSTRACT

A telephone cradle has ratcheting, sliding walls which engage a telephone and hold it securely. A ratchet release button, operable by the same hand that grasps the telephone, releases the sliding walls when it is desired to lift and use the telephone. The walls are spring-loaded to open and are driven to move equally in opposite directions. A friction plate dampens the motion of the sliding walls. Resilient pads disposed on the sliding walls securely hold the telephone. The cradle may be flexibly mounted to a vehicle.

20 Claims, 13 Drawing Sheets

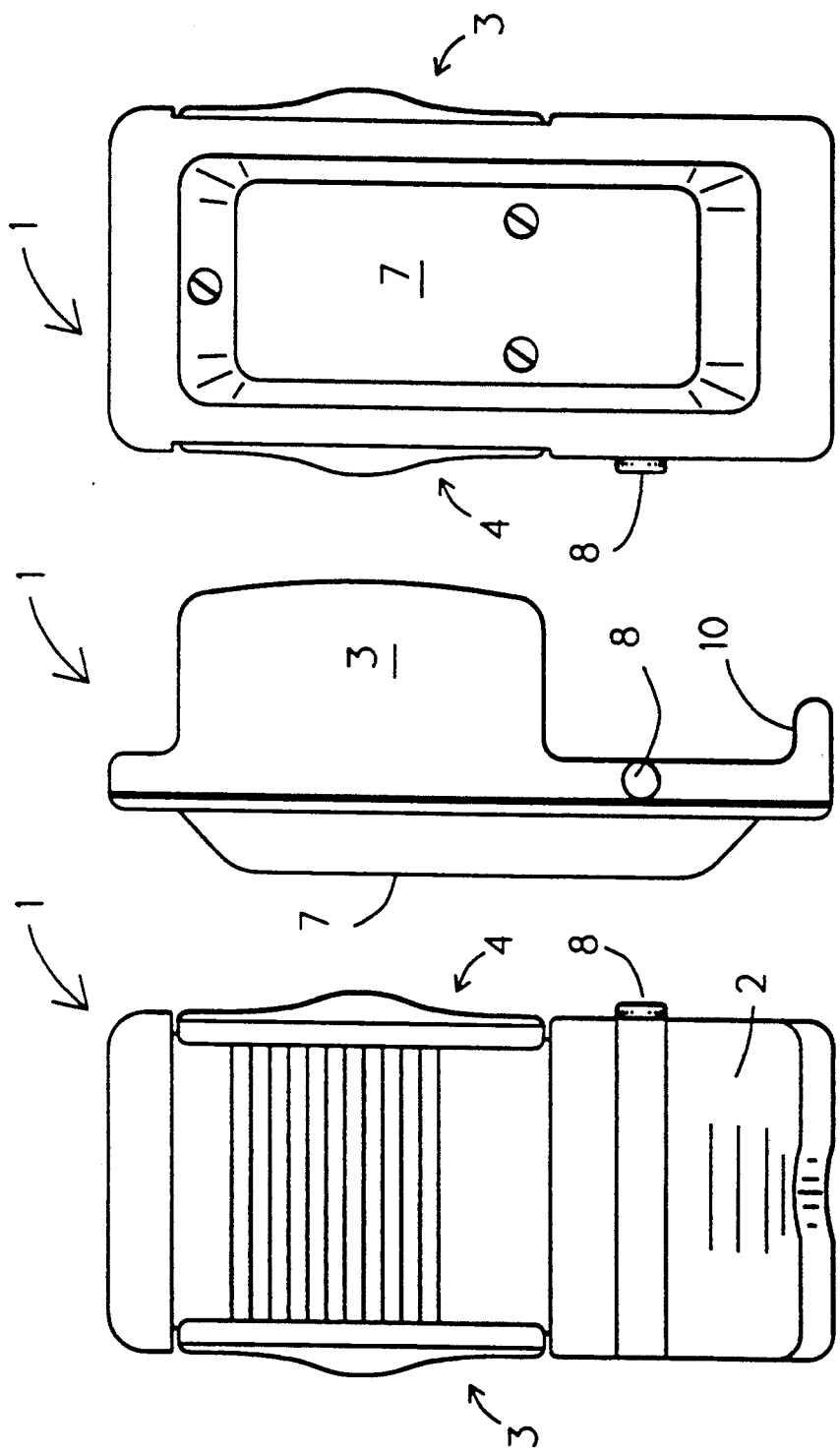

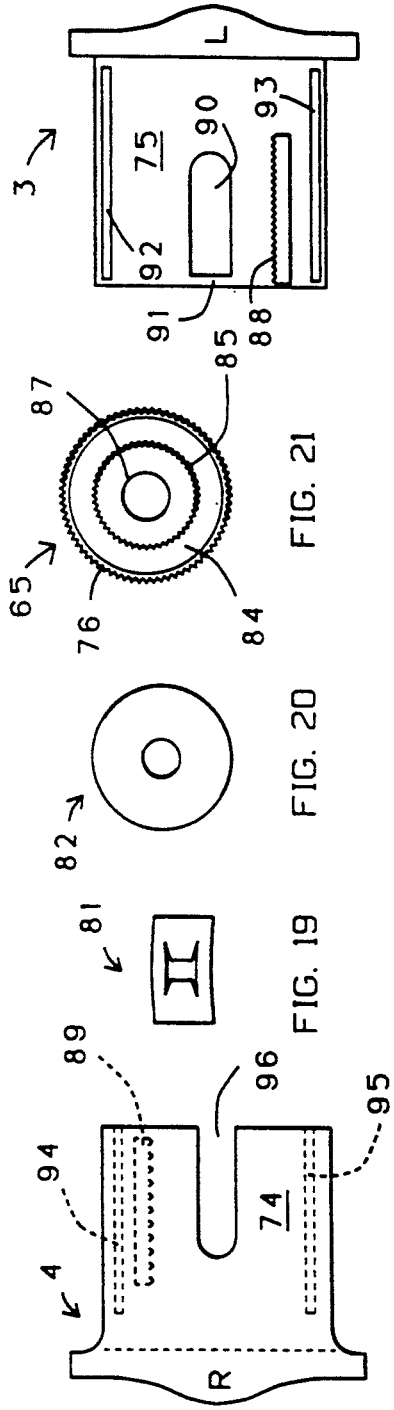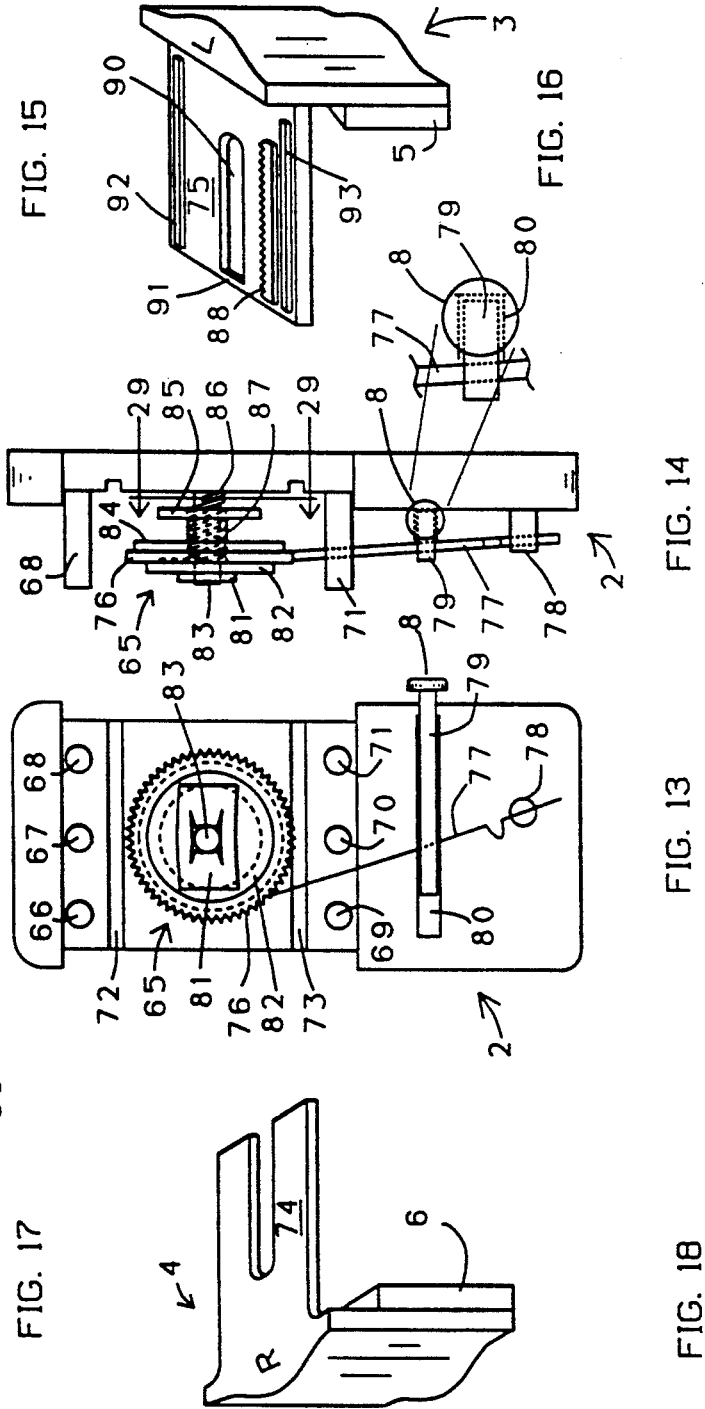

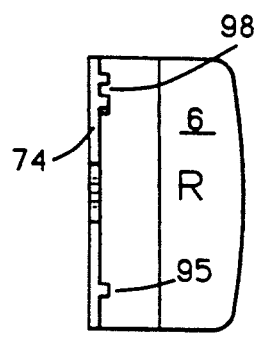
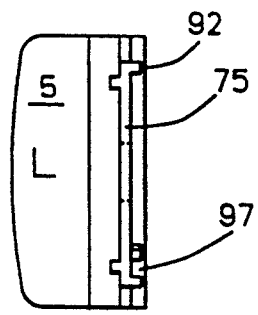
FIG. 25
FIG. 26
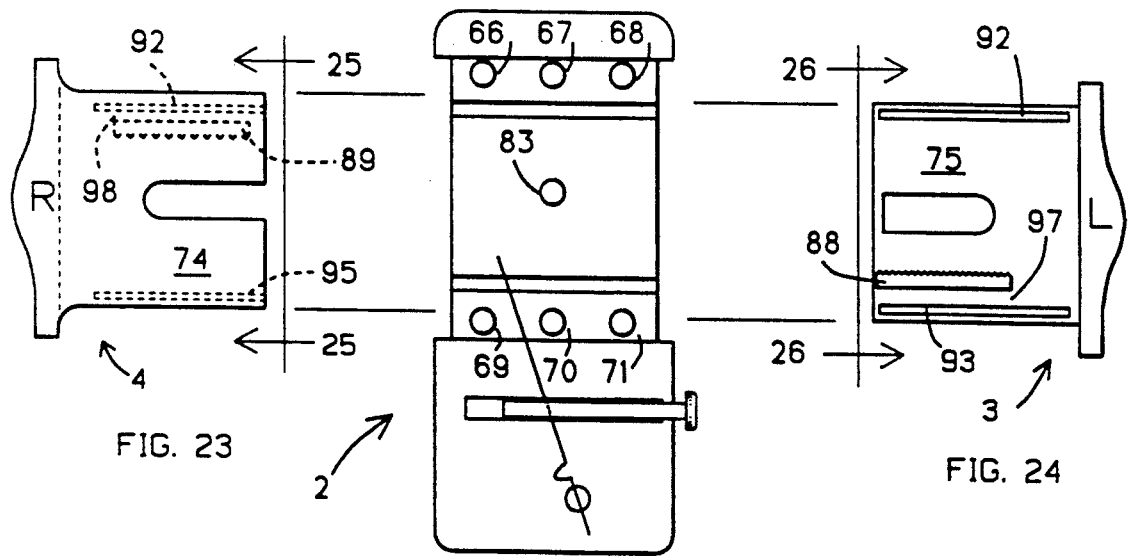
FIG. 23
FIG. 22
FIG. 24

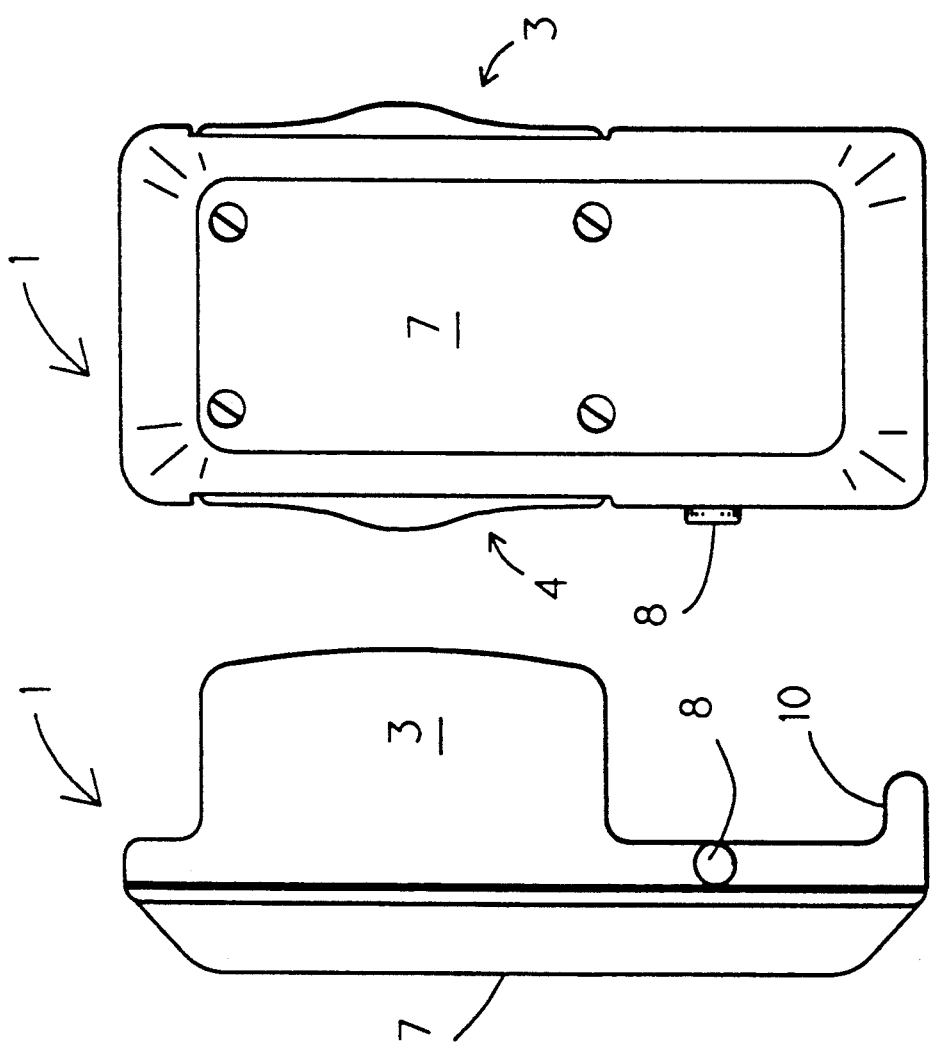

CRADLE FOR TELEPHONE

This invention relates to a telephone cradle which is particularly useful to hold a cellular telephone or a two-way radio. Telephones, including cellular telephones, radiotelephones or two-way radios, are becoming smaller and smaller. However, some radiotelephone means are large and may include sizeable battery packs or other electronic equipment. This invention is universally adapted to hold cellular telephones or radiotelephone means, whether they and their battery packs are large or small. The words "telephone means" in this description and in the claims is intended to include, without limitation, telephones, cellular telephones, radiotelephones, two-way radios and the like, with or without associated battery packs.

Ordinarily, telephone cradles are vertical, or somewhat so, and rely on gravity to hold the telephone in the cradle. Wall telephones often use a upwardly-extending lip on the cradle which engages a downward-facing slot near the top of the telephone handset, relying on gravity to hold the lip engaged in the slot in the telephone handset.

One prior art radiotelephone cradle has a spring-loaded wall to hold the radiotelephone. It has no release means, other than pressing the wall open by hand, against the spring-loading.

Another prior art horizontally-disposed, cellular telephone cradle, found in some expensive automobiles, has a spring-loaded button in the bottom of the cradle, a slot in the front end of the cradle and a horizontal spring-loaded pin in the rear of the cradle. The telephone has a lip at its forward edge which engages the slot in the front of the cradle. To place the telephone in the cradle, the telephone lip is pressed into the slot as the telephone is pressed downwardly into the cradle, depressing the button in the bottom of the cradle. The spring-loaded pin overlies the bottom edge of the telephone and locks it in the cradle. A finger-actuated button releases the spring-loaded pin which allows the spring-loaded button in the bottom of the cradle to push the telephone upwardly to be grasped by the user.

Another telephone cradle, disclosed in U.S. Pat. No. 4,406,928, issued Sep. 27, 1983, uses elongated, flexible clips to hold a telephone in the cradle.

On the other hand, the cradle of this invention has two side walls, at least one of which is movable to successive positions, so as to hold the telephone means securely between the walls. In one embodiment of the invention, only one wall is movable and can be released to remove the telephone means. In the preferred embodiment, two movable side walls ratchet to successive positions to securely hold the telephone means in the cradle. The walls are releasable so as to spring open. The use of such structure provides a cradle which is universally useful in holding most any size and shape of telephone, such as a two-way radio or cellular telephone and their battery pack. Each wall has a cushion or flexible means for holding the telephone. The invention is particularly suited for use in a vehicle.

It is, therefore, an object of this invention to provide a cradle having walls, at least one of which is movable and adapted to receive and hold telephone means.

It is another object of this invention to provide a cradle adapted to hold telephone means between two side walls, at least one of which is movable to successive positions.

Still another object of this invention is to provide a cradle adapted to hold telephone means by a movable wall which can be readily released.

A still further object of this invention is to provide a cradle adapted to hold telephone means so that it can be deposited, grasped and released with one hand.

A further object of this invention is to provide a cradle having two walls for engaging and holding telephone means.

Another object of this invention is to provide one or more ratcheting walls which have cushion means to receive and hold telephone means.

Other objects and features will be apparent from the description and drawings set forth below.

FIG. 12 is a front view of an assembled telephone cradle.

FIG. 12A is a side view, showing particularly the back cover plate and the lower lip in profile.

FIG. 12B is a bottom view of the telephone cradle, showing the back cover plate.

FIG. 13 is a bottom view of the base plate of the cradle, with the bottom cover removed and the sliding walls removed, but showing the ratchet assembly.

FIG. 14 is a side view of the base plate, with the back cover plate and sliding walls removed, but showing, in place, the ratchet assembly, comprising lock nut, washer, ratchet gear, ratchet pawl blade, pushbutton, friction washer and coordinating gear.

FIG. 15 is top view of the left wall of the cradle.

FIG. 16 is a perspective of the left wall of the cradle.

FIG. 17 is a top view of the right wall of the cradle.

FIG. 18 is a perspective of the right wall of the cradle.

FIG. 19 is a top view of the lock nut.

FIG. 20 is a top view of the washer.

FIG. 21 is a bottom view of the ratchet gear assembly.

FIG. 22 is a bottom view of the base plate, with ratchet assembly and side walls removed.

FIG. 23 is a top view of the right wall of the cradle.

FIG. 24 is a top view of the left wall of the cradle.

FIG. 25 is a view of the right wall of the cradle, taken on line 25—25 of FIG. 23.

FIG. 26 is a view of the left wall of the cradle, taken on line 26—26 of FIG. 24.

FIG. 32 is a side view of the telephone cradle with the bottom cover in place.

FIG. 33 is a bottom view of the telephone cradle, with the bottom cover in place.

DETAILED DESCRIPTION

Figure 1:
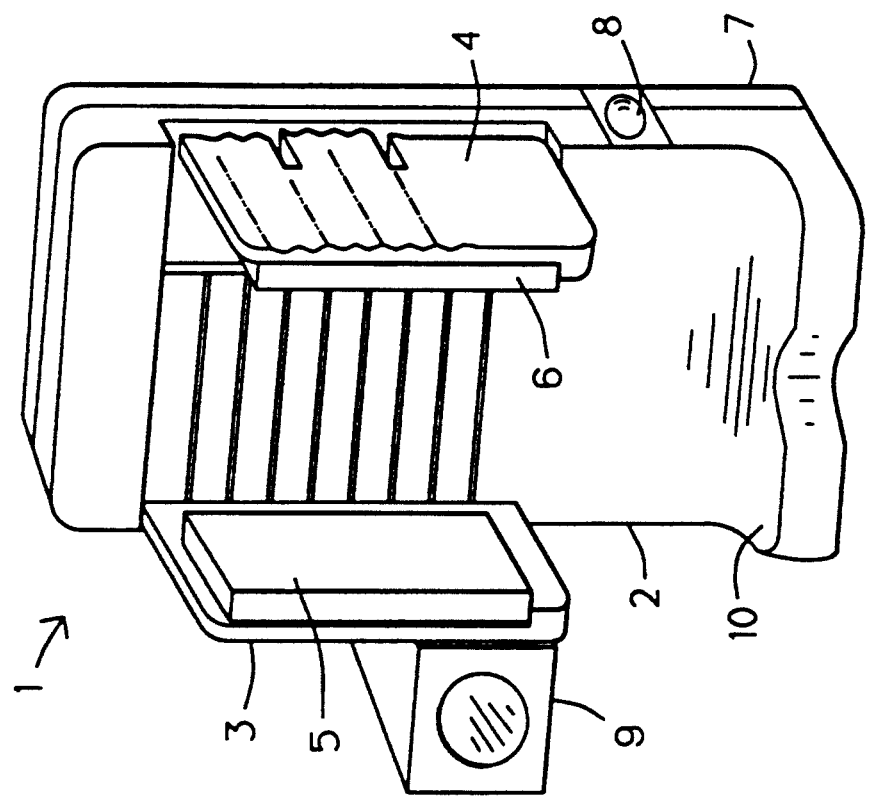
FIG. 1 is a perspective of the telephone cradle, showing a movable side wall, a release button and a socket for a cigarette lighter.

FIG. 1 is a perspective of the telephone cradle 1, showing a base member 2, a first wall 3 and a second, sliding wall 4, disposed oppositely from first wall 3. The base member 2, in the embodiment shown, is curved to form a lip 10, which serves to further hold the telephone means within the cradle, particularly, if the cradle is mounted to slant upwardly, for convenient use. Resilient pads 5 and 6 mounted on walls 3 and 4 assist the walls to securely hold the telephone means placed in cradle 1.

A back cover plate 7 is removable to allow assembly of the internal mechanism of the telephone cradle 1. A cigarette lighter socket 9, or other accessory such as a battery charger, may be mounted on the side of wall 3.

In the embodiment of FIG. 1, sliding wall 4 is spring-loaded to open but is held at several successive positions, by ratchet means, described hereafter, contained within the base member 2. To deposit the telephone means, button 8 is pressed, releasing wall 4 to its open position. The telephone means is deposited and wall 4 is pushed against the telephone means by finger-pressure. The telephone means is then securely held between resilient pads 5 and 6. The telephone means may or may not rest against the lip 10. To remove the telephone means, button 8 is pressed to release the ratchet means which allows the spring-loaded wall 4 to move to its open position. The telephone means is then simply removed.

It is noted that the telephone means can be deposited or removed by a single hand. The little finger or one of the other fingers can operate button 8, to release the telephone means, at which time the same hand can remove the telephone means. Similarly, finger pressure can be used to move sliding wall 4 against the telephone means when it is deposited.

Resilient pads 5 and 6 are preferably of a thickness allowing secure holding, or clamping, of the telephone means at particular ratchet positions. In other words, after the resilient pads 5 and 6 engage the telephone means, one should be able to tighten up the sliding wall another ratchet tooth or two, compressing resilient pads 5 and 6.

Figure 2:
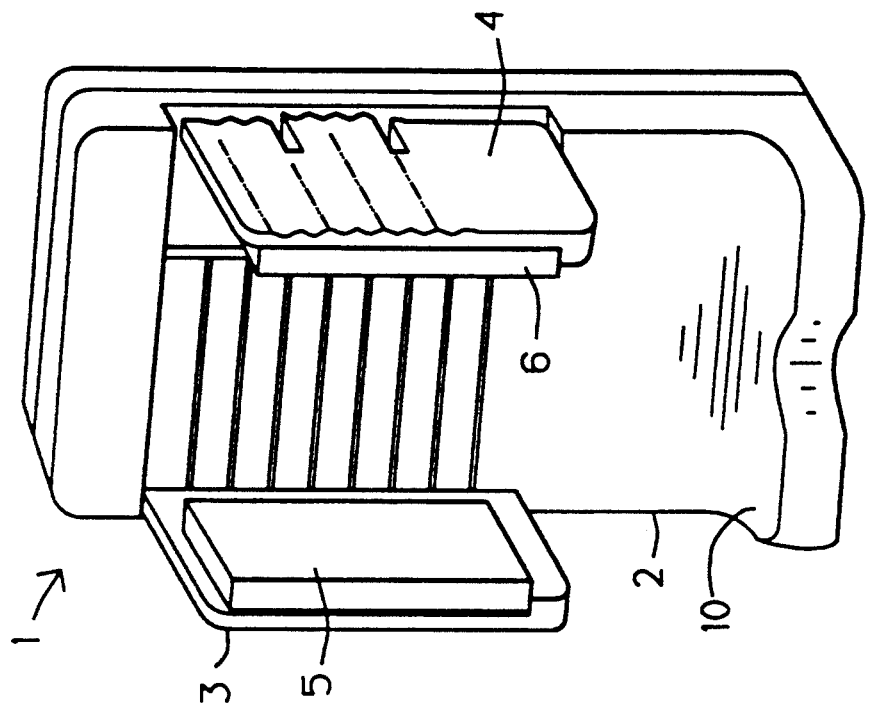
FIG. 2 is a perspective of a prior art telephone cradle, having one spring-loaded wall and no release button or other release means.

FIG. 2 illustrates a prior art embodiment of telephone cradle 1 in which the sliding wall 4 is spring-loaded to close. There is, therefore, no release button or other means for releasing wall 4. Wall 4 is simply spring-loaded to close. In this embodiment, finger pressure is used to push wall 4 open and the telephone means is inserted and the wall 4 is released and allowed to close, by its spring-loading, against the telephone means. To remove the telephone means, wall 4 is pushed away from the telephone means and the telephone means is simply lifted out of the cradle 1.

Figure 3:
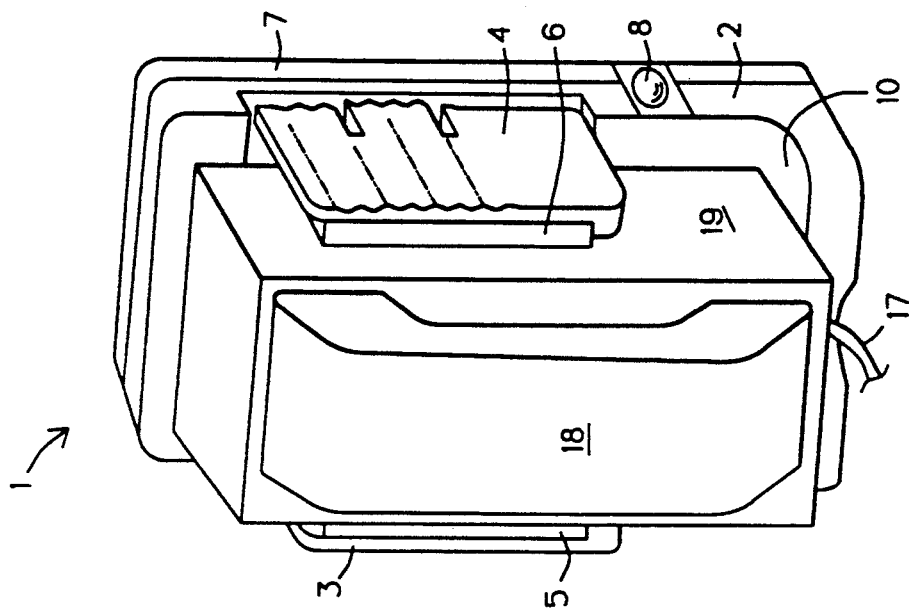
FIG. 3 illustrates a cellular telephone, having a battery pack, in the cradle.

FIG. 3 illustrates a telephone means 11 deposited in the telephone cradle 1. As may be seen, it is securely held between resilient pads 5 and 6 and, also, may rest against lip 10. The telephone means 11 includes a removable, rechargeable, battery pack 12. The dial keys, such as 13 and 14 are readily operable when the telephone is deposited. Earphone 15 and microphone 16 are also shown. The battery pack 12 may be recharged from the cigarette lighter socket of the automobile. Connector cord 17 provides such connection. Connector terminals for charging the battery pack 12 may be built into the telephone cradle and connected to the automobile battery, if desired.

Figure 4:
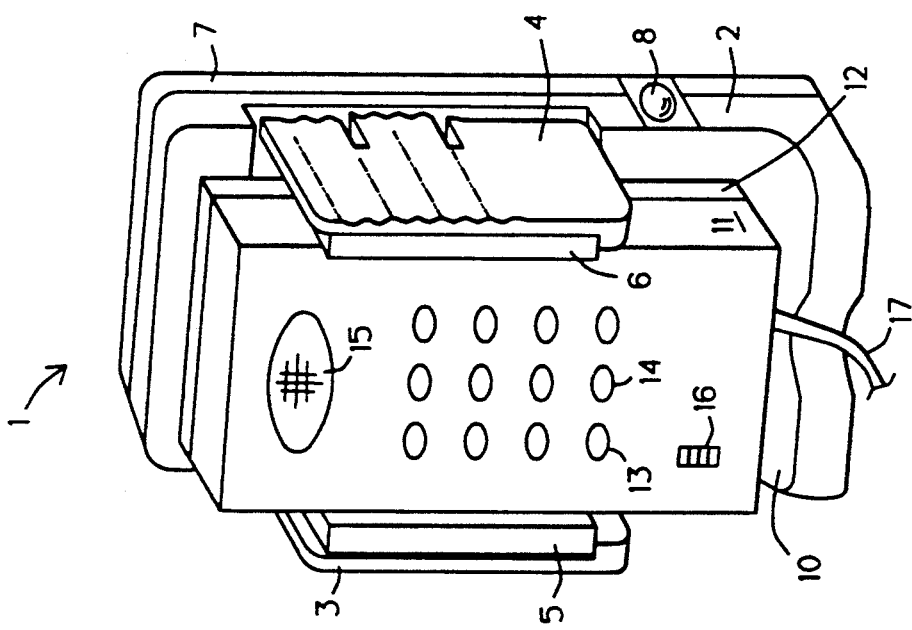
FIG. 4 illustrates a radiotelephone means, comprised of two parts, the handset and the battery pack, in the cradle.

FIG. 4 shows a more complicated telephone means, having a removable handset 18 and a larger battery pack or auxiliary electronics 19. Such larger telephone means is readily accommodated and may be seen to be securely held between resilient pads 5 and 6. Again, the telephone means may also rest against lip 10.

Figure 5:
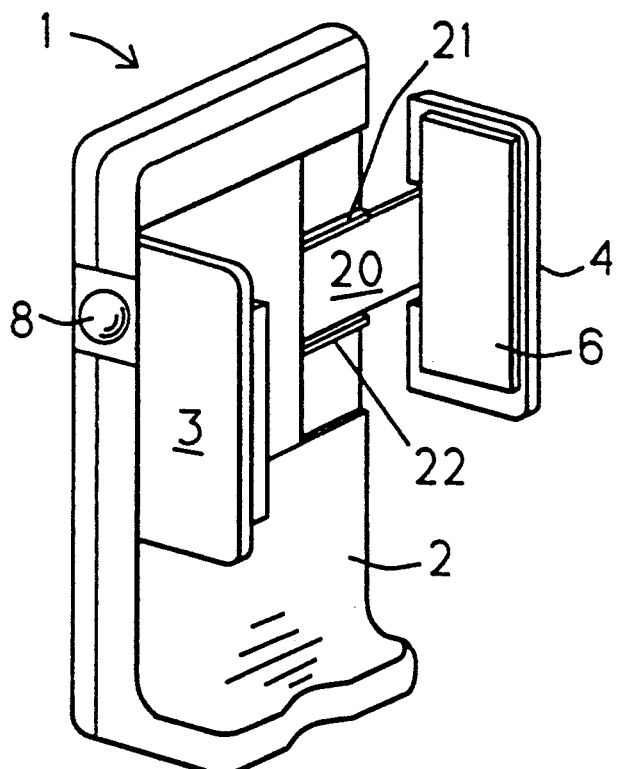
FIG. 5 shows a cradle having a release button on the side opposite the sliding wall and the release button is disposed toward the forward, or top, end of the cradle.

FIG. 5 illustrates another embodiment of the telephone cradle 1 in which button 8 is located to be operated by the thumb, to release wall 4. Also illustrated is slide plate 20 which is attached to wall 4 and is guided by rails 21 and 22.

Figure 6:
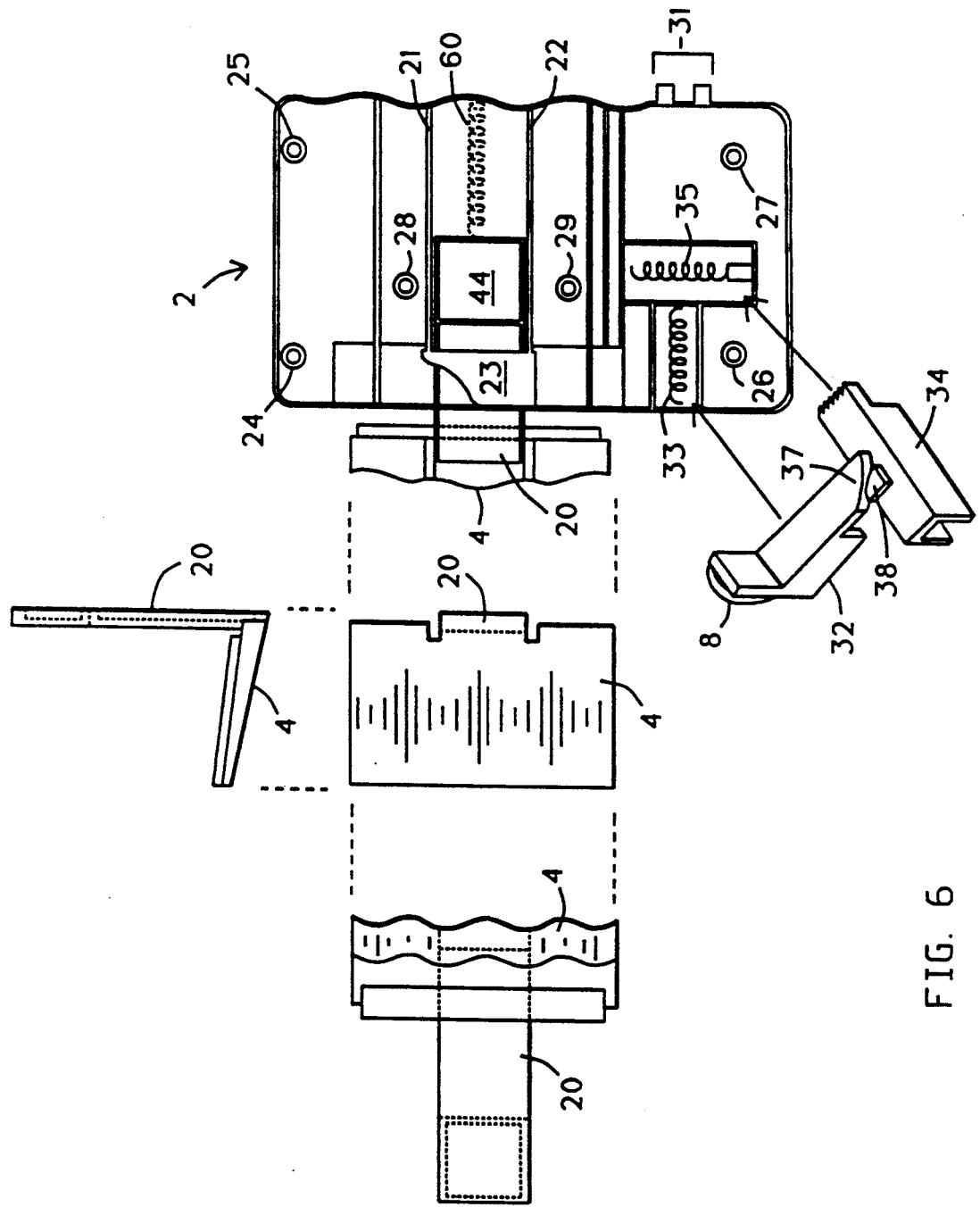
FIG. 6 is a composite view showing the interior of the base of the telephone cradle, looking from the bottom, the sliding wall and its slide plate, in various views.

FIG. 6 is a composite view showing the interior of the base 2 of the telephone cradle, looking from the bottom, the sliding wall 4 and its slide plate 20, in various views, showing the sliding rails 21 and 22, circular studs 24 to 27, which provide standoff for the back cover plate 7, not shown, and are adapted to receive screws for attaching the back cover plate. Also shown are guide studs 28 and 29, and the push-button 8 and ratchet pawl 34, which are spring-loaded by springs 33 and 35. Wall 4 and slide plate 20 are illustrated in front, top and side views. Also, it may be seen that slide plate 20 slides between rails 21 and 22 which were also visible in FIG. 5. Slide plate 20 enters base 2 underneath plate 23. Studs 28 and 29 provide guides for two slots in a sliding plate 36, shown in FIGS. 7, 8 and 9. A bracket 31 may provide means for mounting a charger, cigarette lighter or other accessory.

Button 8, which releases the ratchet may be seen to be attached to a small, button box 32 which, when in place, covers spring 33. Spring 33 provides spring-loading for the button, to hold it outwardly. Ratchet pawl 34 comprises a small box which, when in place covers spring 35. Spring 35 provides spring-loading to hold the ratchet pawl 34 against the teeth of the ratchet gear 30, disposed on sliding plate 36, FIGS. 7 and 8. As may be seen in FIG. 6, when button 8 is pressed, the cam 37 pushes cam 38 in a direction to release the ratchet gear 30 and the wall 4 which, because of spring 41, shown in FIGS. 7 and 8, moves the slide 20 and the wall 4, of the cradle, to open.

It is noted that button 8 and box 32 may be constructed on the opposite wall of base 2, by simply a mirror construction of the cam structures 37 and 38.

Thus, it may be seen that releasing buttons may be placed on opposing sides of the base, or two buttons may be placed, in spaced apart fashion, on the same side.

For a simple, spring-loaded structure, such as described with reference to prior art, FIG. 2, a spring 60, shown in dotted lines, is connected from slide plate 20 to the wall of case 2. In that embodiment, no ratchet or release mechanisms are involved.

Figure 7:
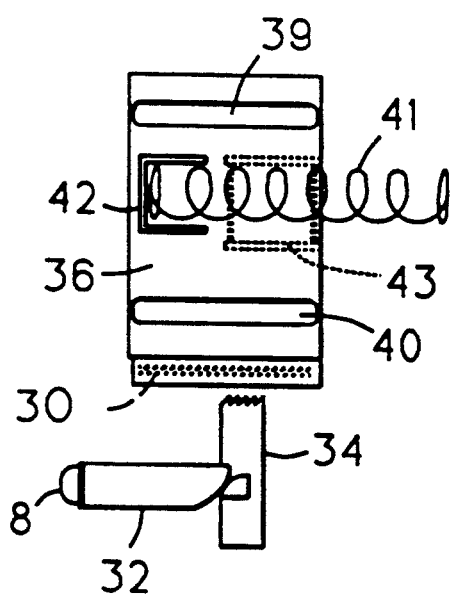
FIG. 7 illustrates the ratchet plate, ratchet pawl and push button.

FIG. 7 illustrates the sliding plate 36, ratchet pawl 34 and push button 8. Sliding plate 36 operates in conjunction with ratchet pawl 34 and release button 8. Sliding plate 36 has slots 39 and 40 through which studs 28 and 29, FIG. 6 extend, to provide guidance. Sliding plate 36 is spring-loaded by spring 41 acting against wall 42. That is, spring 41 biases wall 42 to open when the ratchet pawl 34 is released.

Figure 8:
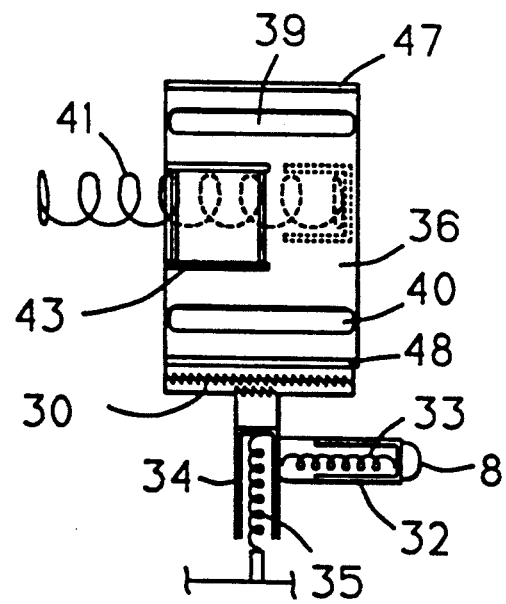
FIG. 8 illustrates the underside of the ratchet plate, pawl and push button.

FIG. 8 shows the underside of sliding plate 36, pawl 34 and button box 32, together with springs 33 and 34 which spring-load them. Box 43 on the underside of sliding plate 36 fits within box 44 on slide plate 20, FIG. 6, causing wall 4 to move with sliding plate 36. That is, the slide plate 20 is interlocked with sliding plate 36, so as to move therewith.

Figures 9, 10:
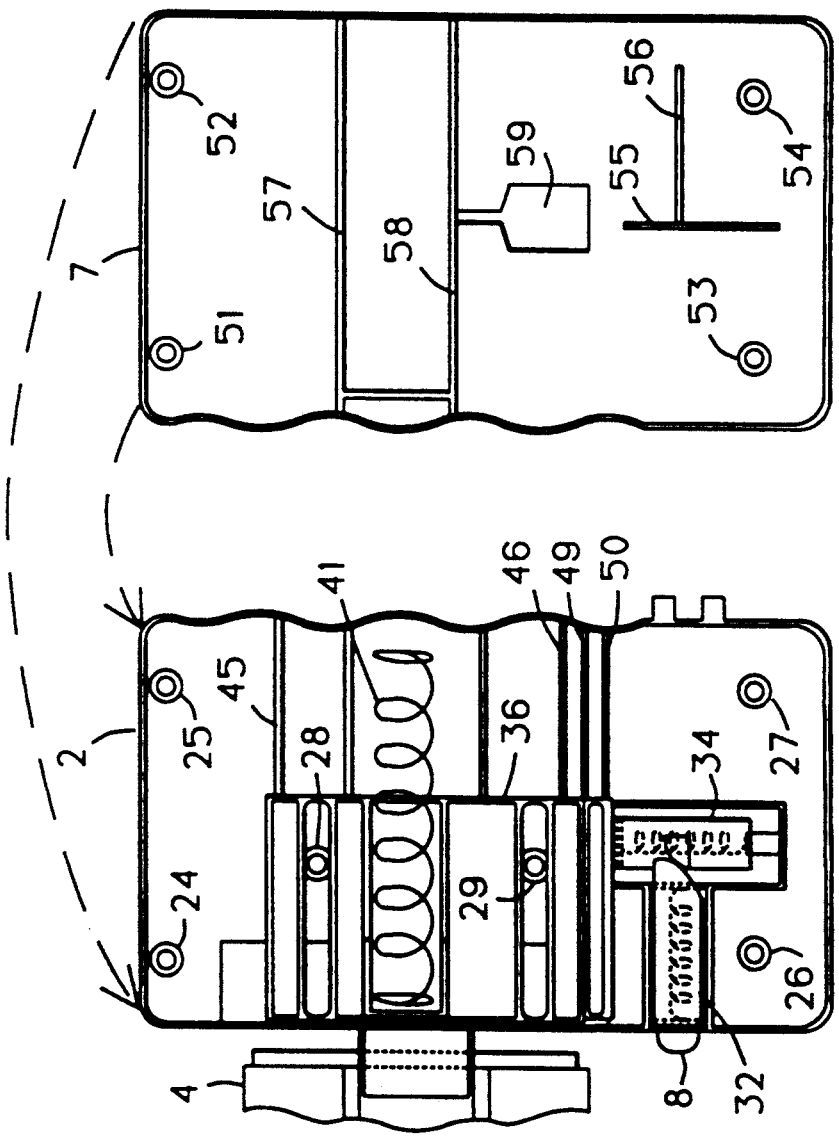
FIG. 9 shows the ratchet plate in place, inside the base of the cradle, together with the pawl and pushbutton.
FIG. 10 shows the cover plate for the back of the telephone cradle.

FIG. 9 illustrates sliding plate 36 in place within base 2. In addition to the guidance for sliding plate 36, provided by studs 28 and 29, rails 45 and 46 of base 2 cooperate with rails 47 and 48 of the sliding plate 36, FIG. 8, to guide sliding plate 36. Rails 47 and 48 of the sliding plate 36 lie outside rails 45 and 46 of the base 2. Rails 49 and 50 hold the pawl 34 firmly in the same plane as sliding plate 36 and prevent them from becoming misaligned.

FIG. 10 illustrates the back cover plate 7, showing studs 51 to 54 which mate with studs 24 to 27 of base 2, FIG. 9. Studs 24 to 27 are adapted to receive threading screws and studs 51 to 54 are hollow, allowing the screws to pass through. A countersink in each stud 51 to 54, from the back of back cover plate 7, prevents the screw heads from passing completely through back cover plate 7, and thereby hold back cover plate 7 to base 2. Rails 55 and 56 hold pawl 34 and button box 32 in place, but allow them to slide freely. Rails 57 and 58 hold sliding plate 36, FIG. 9, in place, allowing it to slide freely. Slot 59, in back cover plate 7, permits attaching a base mount to the telephone cradle.

It is noted that wall 3, in the various Figures. need not be rigidly mounted to slide plate 20 but may, itself, be spring-loaded, and move within a limited range with respect to slide plate 20. Such an embodiment could readily be constructed using the teachings herein.

Figure 11:
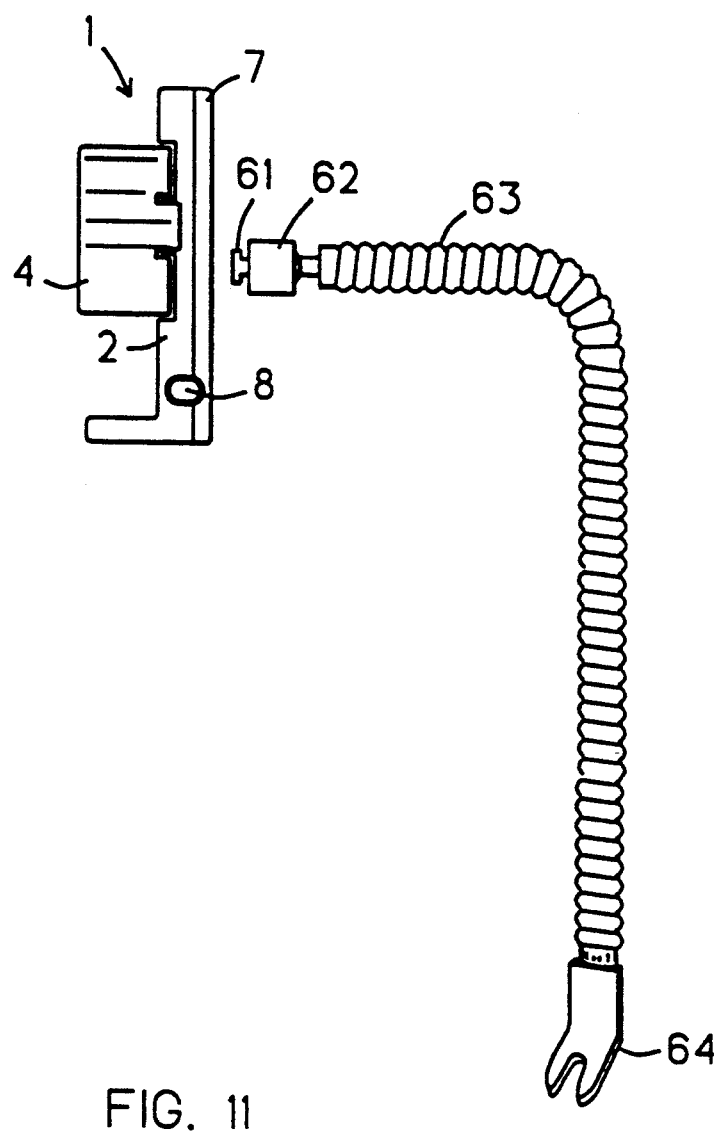
FIG. 11 is an illustration of a ball and socket and flexcable floor mount for the telephone cradle.

FIG. 11 is an illustration of a ball and socket 62 and flex-cable 63 floor mount for the telephone cradle 1. The embodiment illustrates a floor mounting means which is, preferably, flexible. Telephone cradle 1 may have therein a slot, such as 59, FIG. 10, or other structure adapted to receive collar 61 which is attached to ball and socket 62, which is further attached to flex-cable 63. At the bottom end of flex-cable 63 is an open toe 64 which may be bolted to the floor of a vehicle, or simply slid under a nut or plate already in the vehicle. Other means of mounting telephone cradle 1 may be used, including mounting on or under the instrument panel, or mounting in or on a console adjacent the front seats of the vehicle. With a flex-cable mounting means, telephone cradle 1 may be adjusted to a convenient position for the driver or passenger.

FIG. 12 is a front view of the telephone cradle 1, showing the left wall 3 and the right wall 4.

FIG. 12A is a side view of the telephone cradle 1, showing the back cover plate 7 in profile. Also shown is lip 10, shown in profile. Button 8 for releasing one or both walls is on the same side as wall 3 in this embodiment. In contrast, the embodiment shown in FIG. 12, has the button 8 on the same side as wall 4.

FIG. 12B is a bottom view, showing back cover plate 7. In this view, button 8 is disposed on the same side as wall 4.

FIG. 13 is a bottom view of base plate 2 of the telephone cradle, with the bottom cover removed and the sliding walls removed, but showing the ratchet assembly 65 in place. Studs 66 to 71 and channels 72 and 73 help guide the slide plates 74 and 75 of the left and right sliding walls 3 and 4, shown in adjacent FIGS. 16 and 18. Alternatively, of course, channels 72 and 73 may be guide rails. Ratchet gear 76 is held by ratchet pawl blade 77 against rotation which would cause the walls 3 and 4 to open. Ratchet pawl blade 77 is a blade spring and is mounted on stud 78. The ratchet gear 76 is released by button 8 moving bar 79 within channel 80. Ratchet pawl blade 77 passes through a hole or channel in bar 79 and when the bar 79 is moved, the ratchet pawl blade 77 is bent away from the ratchet gear 76, allowing the gear to rotate so as to open the walls 3 and 4. A lock nut 81 disposed over a washer 82 holds the ratchet gear assembly 65 in place on stud 83.

FIG. 14 is a side view of the base plate 2, of FIG. 13, showing the ratchet assembly 65, comprising lock nut 81, washer 82, ratchet gear 76, ratchet pawl blade 77, pushbutton 8, a felt, friction plate 84 and coordinating gear 85. Spring 86 is anchored at one end in stud 83 and, passing through hub 87, is anchored at the other end in a slot in ratchet gear 76.

As the sliding walls 3 and 4 are closed, through linear gears 88 and 89, they cause the ratchet gear 76 to wind up spring 86. However, ratchet gear 76 cannot unwind the spring 86, as the spring 86 urges it to do, until button 8 releases ratchet pawl blade 77 from against the ratchet gear 76. For visualization, slide plate 75 fits underneath, to the right in FIG. 14, of coordinating gear 85 and slide plate 74 fits above, to the left, of coordinating gear 85. This structure is further illustrated and discussed in connection with FIG. 29, taken on line 29—29 of FIG. 14.

It is noted that spring 86 is disposed within hub 87 which connects ratchet gear 76, friction plate 84 and coordinating gear 85. When coordinating gear 85 is rotated by linear gears 88 and 89, illustrated in FIGS. 15 and 17, as the walls 3 and 4 open or close, the ratchet gear 76 must also rotate by reason of being connected to coordinating gear 85 by hub 87.

A telescopic view of button 8 area, more clearly shows the button 8, bar 79 and channel 80.

Friction plate 84 slows the opening of walls 3 and 4 when the button 8 is pushed. Friction plate 84, preferably comprised of felt, rotates against the flat surface of slide plate 74 and gives a "quality feel" to the operation of the walls 3 and 5. In other words, friction plate 84 provides damping means for the motion of the walls. Other damping means could be used, such as sliding springs, dashpots, liquid or gas flow dampers or otherwise.

FIG. 15 is a top view of the left wall 3 of the cradle, showing slide plate 75 having a guide slot 90 with a limit stop 91. Guide slot 90 encompasses stud 83, FIGS. 13 and 14. Limit stop 91 prevents slide plate 75 from disengaging stud 83. On slide plate 75 is linear gear 88 and guide channels or rails 92 and 93. Resilient pad 5 is disposed on wall 3 and is resilient enough to allow one or more gear teeth on ratchet gear 65 to pass ratchet pawl blade 77 after the walls are closed on the telephone. In this way, the telephone is firmly held within the cradle.

FIG. 16 is a perspective of the left wall 5 of the cradle showing the same elements as shown in FIG. 15.

FIG. 17 is a top view of the right wall 4 of the cradle. It has a linear gear 89 and two guide rails or channels 94 and 95 on the under side of slide plate 74. Rail 92 on slide plate 75, FIG. 15, slides between rail 95 and linear gear 89, on slide plate 74, FIG. 17. An alternate construction may be one in which 94 is a channel and rail 92 slides within the channel 94. Slide plate 74 has slot 96 which is shown as open at its end, but may be constructed with a barrier such as barrier 91 on slide plate 75, FIG. 15. However, to do so, coordinating gear 85 would have to be removable from hub 87, because slide plate 74 and its slot 96 engage the hub 87 between coordinating gear 85 and friction plate 84. Alternately, if a barrier is desired for slot 96, it could be added after the slot is placed over hub 87.

FIG. 18 is a perspective of the right wall 4 of the cradle, showing resilient pad 6 and slide plate 74.

FIG. 19 is a top view of the lock nut 81 also shown in place holding down the ratchet gear assembly 65 on stud 83, in FIG. 13.

FIG. 20 is a top view of the washer 82 which is also shown in place in FIG. 13, underneath lock nut 81 but on top of ratchet gear assembly 65.

FIG. 21 is a bottom view of the ratchet gear assembly 65, showing the coordinating gear 85, which coordinates the movement of slide plates 74 and 75 and thus, coordinates the movements of walls 4 and 3. The wall 4 and 3 thus move together, equally, in opposite directions. Also, in FIG. 21 may be seen the felt, friction plate 84, the hub 87 and the ratchet gear 76.

FIG. 22 is a bottom view of the base plate 2, with the bottom cover, ratchet assembly, and side walls removed. FIG. 22, in combination with FIGS. 23, 24, 25 and 26 show how the slide plates 74 and 75 engage the base plate 2 and each other. Slide plate 75 lies closer to the base plate 2 than does slide plate 74 which is separated from slide plate 75 by the interposed coordinating gear 85, shown in FIG. 14. The slide plates, as explained in connection with FIGS. 15 and 17, engage each other using rails and slots and discussed in connection with FIGS. 25 and 26. Also shown is stud 83 on which the ratchet assembly 65 is mounted.

FIG. 23 is a top view of the right wall 4 of the cradle.

FIG. 24 is a top view of the left wall 3 of the cradle.

FIG. 25 is a view of the right wall of the cradle, taken on line 25—25 of FIG. 23.

FIG. 26 is a view of the left wall of the cradle, taken on line 26—26 of FIG. 24.

Referring to FIGS. 23 to 26, in a preferred embodiment, rail 95, FIGS. 23 and 25, engages the slot 97, FIGS. 24 and 26, between rail 92 and linear gear 88. Similarly, rail 92, FIGS. 24 and 26, engages the slot 98 between rail 92 and linear gear 89.

Figure 27:
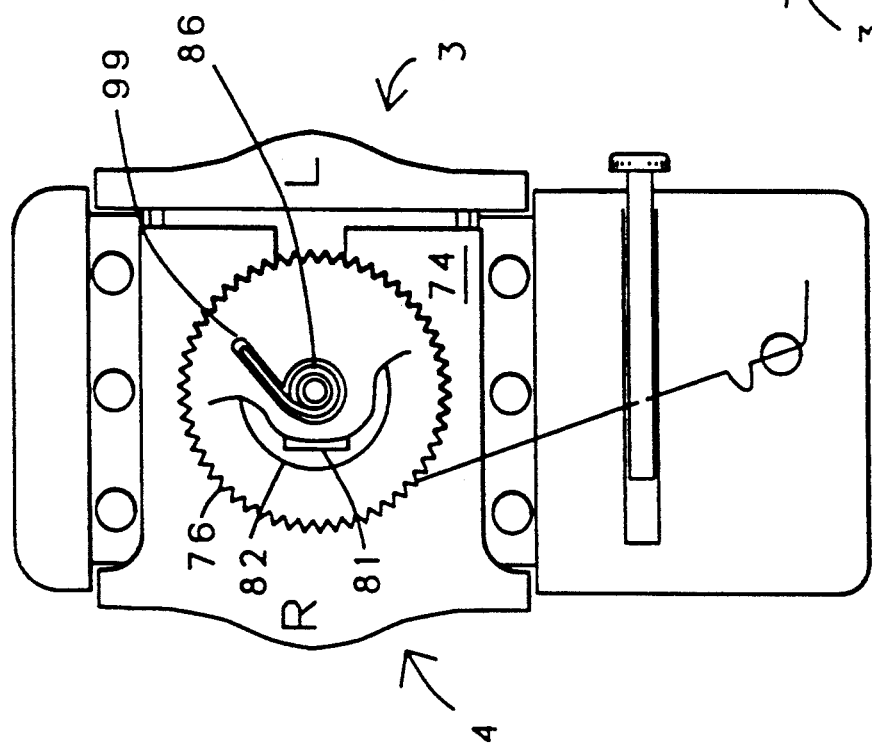
FIG. 27 is a view of the bottom of the telephone cradle, with the bottom cover plate removed showing the ratchet gear and the right and left walls in closed position.

FIG. 27 is a view of the bottom of the telephone cradle, with everything assembled and walls 3 and 4 closed, but with the bottom cover plate removed. Ratchet gear 76 is on the near side of slide plate 74 as are washer 82 and lock nut 81 which are shown in cut-away view. Slot 99 in ratchet gear 76 receives the end of spring 86. The end of spring 86 may be retained in slot 99 by washer 82. It can be seen that the spring 86, when wound up by the clockwise rotation of ratchet gear 76, urges counterclockwise rotation of ratchet gear 76. The gear 76, of course, cannot unwind counterclockwise until ratchet pawl blade 77 is forced away from the ratchet gear 76 by pressing button 8.

Figure 28:
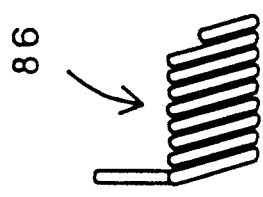
FIG. 28 is the ratchet assembly spring.

FIG. 28 is the ratchet assembly spring 86.

Figure 29:
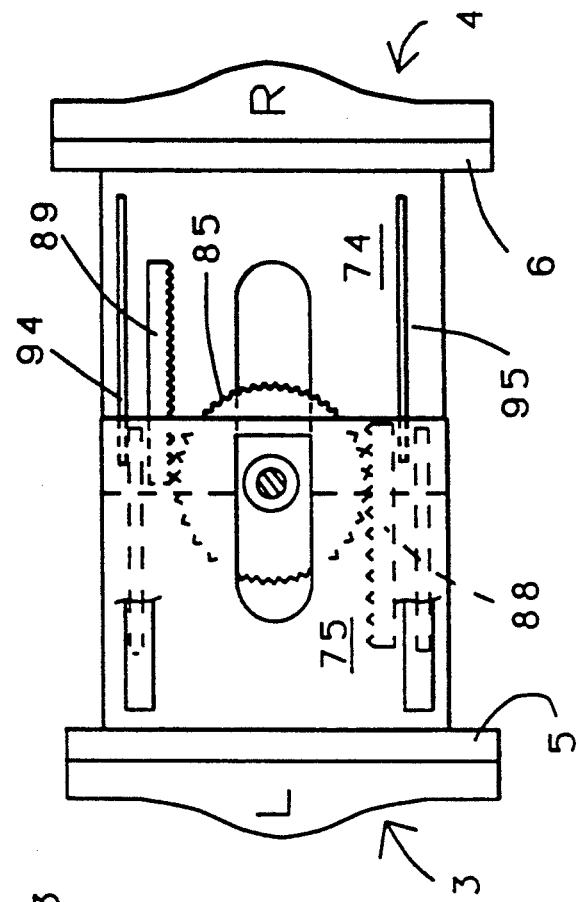
FIG. 29 is a top view of the right and left walls, taken on line 29—29, FIG. 14, showing the coordinating gear disposed between the sliding walls.

FIG. 29 is a top view of the right and left walls 4 and 3, showing the coordinating gear 85 disposed between them. The view is taken from the front of the telephone cradle on line 29—29, FIG. 14, with the right and left walls in place. By means of coordinating gear 85, and the linear gears 88 and 89 on slide plates 75 and 74, the walls 3 and 4 move equally in opposite directions. Further, inasmuch as coordinating gear 85 is connected to ratchet gear 76 by hub 87, FIG. 14, the walls are held in successive positions by the ratchet gear 76, until released by pressing button 8, which causes ratchet blade spring 77 to release ratchet gear 76.

Figure 30:
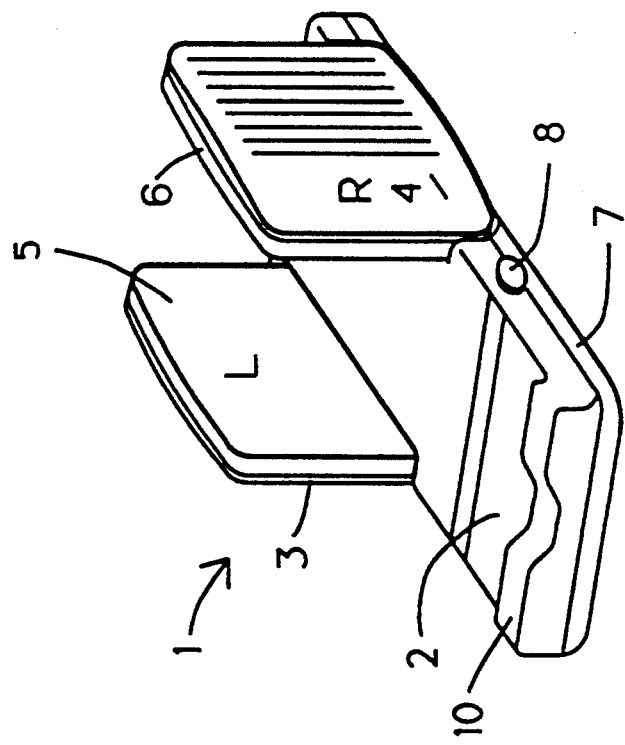
FIG. 30 is a perspective of the telephone cradle having two sliding walls.

FIG. 30 is a perspective of the telephone cradle having two sliding walls 3 and 4, and their resilient pads 5 and 6. Also shown is lip 10.

Figure 31:
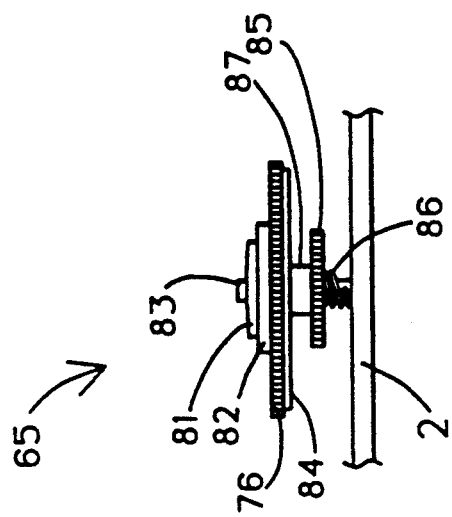
FIG. 31 is a side view of the ratchet gear assembly.

FIG. 31 is a side view of the ratchet gear assembly 65 which is mounted on stud 83 on base plate 2. Spring 86 encircles stud 83 and terminates in slot 99, as shown in FIG. 27. Coordinating gear 85, felt, friction plate 84, ratchet gear 76, washer 82 and lock nut 81 are shown. Hub 85, which connects coordinating gear 85 and ratchet gear 76, is also shown.

FIG. 32 is a side view of the telephone cradle 1 with the bottom cover 7 in place. Left wall 3, button 8 and lip 10 are also shown.

FIG. 33 is a bottom view of telephone cradle 1, showing bottom cover 7 in place, using screw attachments.

Figure 34:
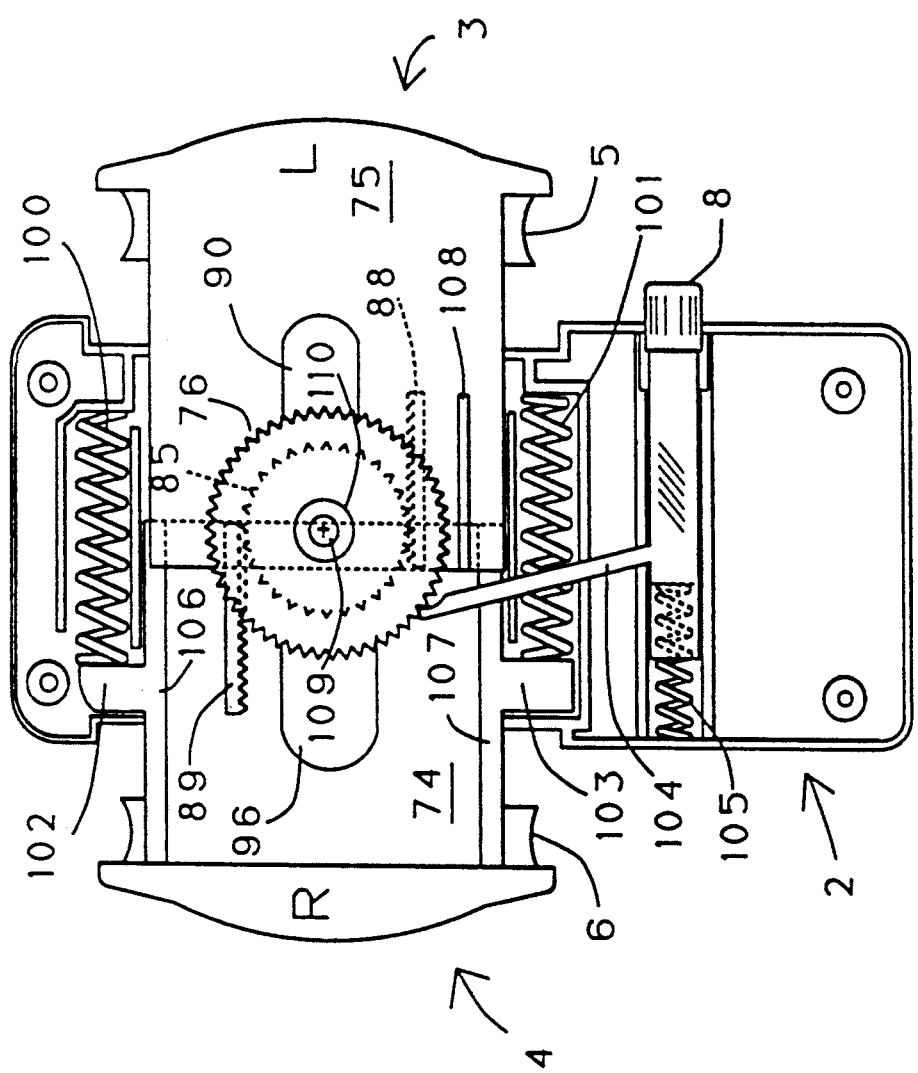
FIG. 34 is a bottom view of another embodiment of the telephone cradle, with the bottom cover removed, and showing another means of spring-loading the walls to open.

FIG. 34 is a bottom view of another embodiment of the telephone cradle 1, with the bottom cover removed. In this embodiment the walls are spring-loaded to open by springs 100 and 101. The springs are each anchored at one end to the base 2. Slide plate 74 has two ears, 102 and 103 which compress springs 100 and 101, respectively, when the walls are closed. At the same time, ratchet gear 76 is held in successive positions by ratchet pawl 104. As in previous embodiments, button 8 actuates ratchet pawl 104, to release ratchet gear 76. Ratchet pawl spring 105 keeps the ratchet pawl 104 engaging ratchet gear 76, except when button 8 is pushed. It is noted in this embodiment that slide plates 74 and 75 are reversed, that is, slide plate 74 is nearest base 2 and slide plate 75 is adjacent ratchet gear 76. The distinction may be noted by comparison with FIG. 27. Further, in this embodiment the friction plate is the ratchet gear which is mounted to bear against slide plate 74. A very viscous oil or grease or a non-hardening sticky substance, is disposed between the ratchet gear 76 and slide plate 75. Those skilled in the art are aware of appropriate substances for use between the ratchet gear 76 and slide plate 75. A literal translation from Taiwanese of a suitable substance is "friction clay". Further, such a viscous oil, grease or sticky substance may be disposed between coordinating gear 85, shown hidden, and also shown in FIGS. 14 and 29, for example, and one or the other of the slide plates 74 and 75.

In FIG. 34, linear gear 89 is shown on top of slide plate 74, which is below coordinating gear 85. Linear gear 88 is shown hidden, on the underside of slide plate 75. As in prior embodiments, coordinating gear 85 and ratchet gear 76 are connected by a common hub, not shown in FIG. 34, but shown in FIGS. 14 and 31. By reason of springs 100 and 101 in the embodiment of FIG. 34, the spring 86 of FIGS. 14 and 31 is unnecessary. A screw 109 and washer 110 hold ratchet gear 76 and coordinating gear 85 in place on a stud 83, shown in FIG. 22.

Further shown in FIG. 34 are slide rails 106 and 107 which provide spacing between slide plate 74 and slide plate 75, in which coordinating gear 85 is located. Slide plates 74 and 75 also provide stability in the sliding motion as their walls 3 and 4 slide open and closed. Slide rail 108 also provides stability to ratchet pawl arm 104, to keep it engaged with ratchet gear 76.

Resilient pads 5 and 6 may be seen in FIG. 34. They are constructed of a thick, sponge rubber. A resilient polyurethane foam, or other resilient material may be used. In the preferred embodiment, the resilience of the two pads will allow the walls to be pressed two or three additional ratchet positions after the pad engages the telephone to be held. In this way, the telephone is firmly held by the compressed, resilient pads.

Although specific embodiments and certain arrangements have been illustrated and described herein, it will be clear to those skilled in the art that various other modifications and embodiments may be made incorporating the spirit and scope of the underlying inventive concepts and that the same are not limited to the particular forms herein shown and described except insofar as determined by the scope of the appended claims.

We claim:

1. A cradle for various sizes of telephone means, said cradle comprising:
   a base;
   first and second walls attached to said base;
   at least one of said walls slidably attached to said base, said sliding wall disposed opposite the other wall and disposed to slide toward and away from said other wall;
   means for holding said sliding wall at several, successive positions against various sizes of said telephone means;
   spring means disposed to urge said sliding wall away from said other wall; and
   means for releasing said means for holding, thereby allowing said spring means to move said sliding wall away from said other wall;
   wherein said means for holding said sliding wall, comprises ratchet means, having several teeth for holding said sliding wall at said several, successive positions.

2. The cradle of claim 1, wherein said ratchet means comprises a ratchet gear and a pawl engaging said ratchet gear; and said means for releasing releases said pawl from engaging said ratchet gear.

3. The cradle of claim 1, wherein one or more of said walls has a resilient pad disposed on a surface facing the other wall, said one or more resilient pads being compressible at least the distance of one successive ratchet position of said sliding wall.

4. A cradle for various sizes of telephone means, said cradle comprising:
   a base;
   first and second walls attached to said base;
   at least one of said walls slidably attached to said base, said sliding wall disposed opposite the other wall and disposed to slide toward and away from said other wall;
   means for holding said sliding wall at several, successive positions against various sizes of said telephone means;
   spring means disposed to urge said sliding wall away from said other wall; and
   means for releasing said means for holding, thereby allowing said spring means to move said sliding wall away from said other wall; wherein both said walls are slidably disposed with respect to said base and said means for holding comprises ratchet means having several teeth, said ratchet means adapted to hold both of said walls in said several, successive positions against said telephone means when said telephone means is disposed in said cradle; and said means for releasing releases both said walls from against said telephone means.

5. The cradle of claim 4, wherein one or more of said walls has a resilient pad disposed on a surface facing the other wall, said one or more resilient pads providing a resilience greater than the successive distance between the successive positions of said sliding wall.

6. The cradle of claim 1, wherein said means for holding comprises ratchet means holding both said walls in said several, successive positions toward each other and wherein said means for releasing comprises means for releasing said ratchet means.

7. A cradle for telephone means, said cradle comprising:
   a base;
   first and second walls attached to said base;
   at least one of said walls slidably attached to said base, said sliding wall disposed opposite the other wall and disposed to slide toward and away from said other wall;
   means for holding said sliding wall against said telephone means when said telephone means is disposed in said cradle;
   means for releasing said sliding wall from against said telephone means;
   wherein said means for holding said sliding wall against said telephone means, comprises ratchet means for holding said sliding wall at successive positions with respect to said other wall;
   wherein said ratchet means comprises a rotating ratchet gear and wherein said cradle includes damping means disposed to damp the motion of each said slidably attached wall, when said wall is released.

8. A cradle for telephone means, said cradle comprising:
   a base;
   first and second walls attached to said base;
   at least one of said walls slidably attached to said base, said sliding wall disposed opposite the other wall and disposed to slide toward and away from said other wall;
   means for holding said sliding wall against said telephone means when said telephone means is disposed in said cradle;
   means for releasing said sliding wall from against said telephone means;
   wherein said means for holding said sliding wall against said telephone means, comprises ratchet means for holding said sliding wall at successive positions with respect to said other wall;
   wherein said ratchet means comprises a rotating gear and a pawl engaging said rotating gear;

wherein said means for releasing comprises means for disengaging said pawl from said rotating gear;

wherein said cradle further includes a coordinating gear disposed on a hub with said rotating gear; and wherein said cradle further includes two linear gears, each said linear gear fixedly attached to a respective one of said sliding walls, said linear gears engaging said coordinating gear.

9. A cradle for telephone means, said cradle comprising:

a base;

first and second walls slidably attached to said base; said walls disposed opposite each other and disposed to slide toward and away from each other;

means for holding said sliding walls against said telephone means when said telephone means is disposed in said cradle;

means for releasing both said sliding walls from against said telephone means; and wherein said means for holding comprises ratchet means holding both said walls in successive positions toward each other; and wherein said means for releasing comprises means for releasing said ratchet means; and wherein said ratchet means comprises a ratchet assembly which comprises a ratchet gear and a pawl engaging said ratchet gear; and wherein said cradle includes a coordinating gear; and wherein said ratchet gear is connected to said coordinating gear, and wherein said cradle includes two linear gears, one of said linear gears fixedly disposed with respect to one of said walls and the other of said linear gears fixedly disposed with respect to the other of said walls, said linear gears being disposed on opposite sides of said coordinating gear, and wherein said coordinating gear engages said linear gears, whereby said walls move equally and in opposite directions with respect to said base.

10. The cradle of claim 9, wherein said cradle includes damping means for damping the motion of said walls.

11. A cradle for telephone means, said cradle comprising:

a base;

first and second walls slidably disposed with respect to said base, said walls being oppositely disposed with respect to each other and disposed to slide toward and away from each other;

means for holding said sliding walls against said telephone means when said telephone means is disposed in said cradle;

means for releasing said means for holding;

means for coordinating the movement of said walls so as to cause them to move equally and in opposite directions with respect to said base; and wherein said cradle includes a slide plate fixedly disposed with respect to each of said slidable walls, each of said slide plates having a linear gear fixedly disposed with respect thereto; and wherein said means for coordinating movement comprises a coordinating gear disposed between said linear gears.

12. The cradle of claim 11, wherein said cradle includes a friction plate disposed to bear against at least one of said slide plates.

13. The cradle of claim 11, wherein said means for holding comprises a ratchet assembly comprising a ratchet gear and a pawl engaging said ratchet gear, and wherein said ratchet gear and said coordinating gear are disposed to rotate together.

14. The cradle of claim 13, wherein said cradle includes spring means disposed to push said walls apart and wherein said means for releasing comprises means for releasing said pawl from engaging said ratchet gear.

15. The cradle of claim 11, wherein said means for releasing comprises one or more buttons disposed on one or more sides of said cradle.

16. The cradle of claim 11, wherein said cradle includes a lip on at least one end of said cradle, said lip extending substantially the width of said base.

17. The cradle of claim 11, wherein said cradle includes flexible means for mounting said cradle, said flexible means comprises an elongated carrier which is flexible substantially throughout its length, said carrier having a ball and socket at one end and wherein said cradle includes means for attaching said ball and socket to said telephone cradle.

18. The cradle of claim 17, wherein said carrier comprises at its other end an open toe adapted to fit around a bolt, for fastening said flexible carrier to a vehicle.

19. A cradle for telephone means, said cradle comprising a base, two walls slidably attached to said base and adapted to slide toward and away from each other, means for sliding said walls equally and in opposite directions from each other, means for holding said walls in successive positions, and means for releasing said means for holding, and wherein said cradle further comprises spring means disposed to urge said sliding walls away from each other;

wherein said cradle includes two slide plates and each of said walls is connected to a respective slide plate, and wherein said cradle includes friction means for damping the motion of said walls, said friction means comprising rotating means caused to rotate against at least one of said slide plates upon the motion of said walls, and wherein a viscous material is disposed between said rotating means and said sliding plate.

20. The cradle of claim 19, wherein said rotating means comprises a coordinating gear disposed between said sliding plates and wherein said viscous material is disposed between said coordinating gear and at least one of said plates.

* * * * *

(12) EX PARTE REEXAMINATION CERTIFICATE (7617th)

United States Patent
Wang et al.

(10) Number: US 5,305,381 C1
(45) Certificate Issued: Jul. 20, 2010

(54) CRADLE FOR TELEPHONE

(75) Inventors: Chin Y. Wang, Taipei Hsien (TW);
Timothy Sheahan, Altadena, CA (US)

(73) Assignee: Piao Shang Industry Co., Ltd.,
Panchiao, Taipei Hsien (TW)

Reexamination Request:
No. 90/010,429, Mar. 26, 2009

Reexamination Certificate for:
Patent No.: 5,305,381
Issued: Apr. 19, 1994
Appl. No.: 07/973,031
Filed: Nov. 9, 1992

(51) Int. Cl.
*H04M 1/00* (2006.01)

(52) U.S. Cl. .................... 379/455; 379/426; 379/454
(58) Field of Classification Search .................. 379/455
See application file for complete search history.

(56) References Cited

U.S. PATENT DOCUMENTS

| | | | |
|---|---|---|---|
| 4,968,077 A | 11/1990 | Redmon, Jr. et al. |
| 5,033,709 A | 7/1991 | Yuen |
| 5,038,331 A | 8/1991 | Ogawa |

FOREIGN PATENT DOCUMENTS

DE 9208180 9/1992

*Primary Examiner*—Colin LaRose

(57) ABSTRACT

A telephone cradle has ratcheting, sliding walls which engage a telephone and hold it securely. A ratchet release button, operable by the same hand that grasps the telephone, releases the sliding walls when it is desired to lift and use the telephone. The walls are spring-loaded to open and are driven to move equally in opposite directions. A friction plate dampens the motion of the sliding walls. Resilient pads disposed on the sliding walls securely hold the telephone. The cradle may be flexibly mounted to a vehicle.

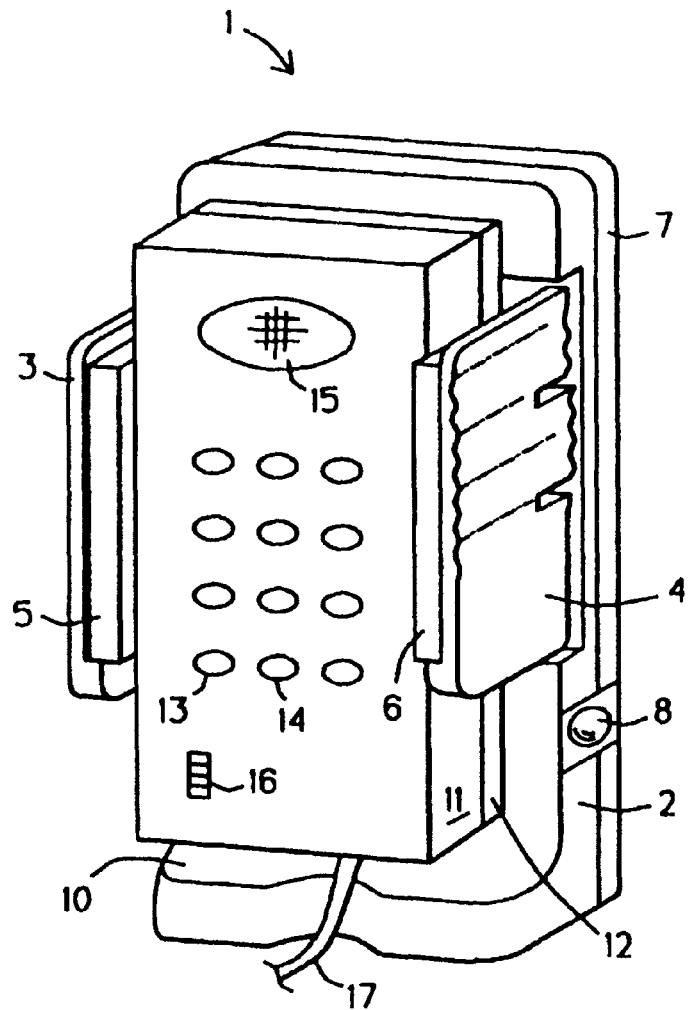

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7, 11, 12 and 15-20 is confirmed.

Claims 8, 9 and 13 are cancelled.

Claims 10 and 14 are determined to be patentable as amended.

New claims 21-39 are added and determined to be patentable.

10. [The cradle of claim 9.] *A cradle for telephone means, said cradle comprising:*
  *a base;*
  *first and second walls slidably attached to said base; said walls disposed opposite each other and disposed to slide toward and away from each other;*
  *means for holding said sliding walls against said telephone means when said telephone means is disposed in said cradle;*
  *means for releasing both said sliding walls from against said telephone means; and*
  *wherein said means for holding comprises ratchet means holding both said walls in successive positions toward each other; and*
  *wherein said means for releasing comprises means for releasing said ratchet means; and*
  *wherein said ratchet means comprises a ratchet assembly which comprises a ratchet gear and a pawl engaging said ratchet gear; and*
  *wherein said cradle includes a coordinating gear; and*
  *wherein said ratchet gear is connected to said coordinating gear, and wherein said cradle includes two linear gears, one of said linear gears fixedly disposed with respect to one of said walls and the other of said linear gears fixedly disposed with respect to the other of said walls, said linear gears being disposed on opposite sides of said coordinating gear, and wherein said coordinating gear engages said linear gears, whereby said walls move equally and in opposite directions with respect to said base; and*
  wherein said cradle includes damping means for damping the motion of said walls.

14. [The cradle of claim 13.] *The cradle of claim 11, wherein said means for holding comprises a ratchet assembly comprising a ratchet gear and a pawl engaging said ratchet gear, and wherein said ratchet gear and said coordinating gear are disposed to rotate together; and* wherein said cradle includes spring means disposed to push said walls apart and wherein said means for releasing comprises means for releasing said pawl from engaging said ratchet gear.

21. *The cradle recited in claim 1 wherein said at least one of said walls slidably attached to said base, is easily slidable toward said other wall by pressure on said at least one of said walls slidably attached to said base.*

22. *The cradle recited in claim 1 wherein said at least one of said walls slidably attached to said base is slidable toward said other wall by finger pressure on said at least one of said walls slidably attached to said base.*

23. *The cradle recited in claim 1 wherein said at least one wall slidably attached to said base is slidable to said successive positions by pressure on said a least one wall.*

24. *The cradle recited in claim 4 wherein both said walls slidably disposed with respect to said base are easily slidable toward each other by pressure on said walls.*

25. *The cradle recited in claim 4 wherein both said walls slidably disposed with respect to said base are slidable toward each other by finger pressure on said walls.*

26. *The cradle recited in claim 4 wherein said at least one wall slidably attached to said base is slidable to said successive positions by pressure on said at least one wall.*

27. *The cradle recited in claim 7 wherein said at least one of said walls slidably attached to said base is easily slidable toward said other wall by pressure on said at least one of said walls slidably attached to said base.*

28. *The cradle recited in claim 7 wherein said at least one of said walls slightly attached to said base is slidable toward said other wall by finger pressure on said at least one of said walls slightly attached to said base.*

29. *The cradle recited in claim 7 wherein said rotating ratchet gear is caused to rotate by pressure on said at least one of said walls slidably attached to said base.*

30. *The cradle recited in claim 8 wherein said at least one of said walls slidably attached to said base, is easily slidable toward said other wall by pressure on said at least one of said walls slidably attached to said base.*

31. *The cradle recited in claim 8 wherein said at least one of said walls slidably attached to said base is slidable toward said other wall by finger pressure on said at least one of said walls slidably attached to said base.*

32. *The cradle recited in claim 8 wherein said linear gears engaging said coordinating gear also drive said coordinating gear.*

33. *The cradle recited in claim 9 wherein said first and second walls slidably attached to said base, are easily slidable toward each other by pressure on said walls.*

34. *The cradle recited in claim 9 wherein said first and second walls slidably attached to said base, are slidable toward each other by finger pressure on said walls.*

35. *The cradle recited in claim 11 wherein said first and second walls slidably disposed with respect to said base, are easily slidable toward each other by pressure on said walls.*

36. *The cradle recited in claim 11 wherein said first and second walls slidably disposed with respect to said base, are slidable toward each other by finger pressure on said walls.*

37. *The cradle recited in claim 11 wherein said linear gears are moved by pressure on said walls.*

38. *The cradle recited in claim 19 wherein said two walls slidably attached to said base, are easily slidable toward each other by pressure on said walls.*

39. *The cradle recited in claim 19 wherein said two walls slidably attached to said base, are slidable toward each other by finger pressure on said walls.*

\* \* \* \* \*